United States Patent

Dijt et al.

[11] Patent Number: 6,017,506
[45] Date of Patent: Jan. 25, 2000

[54] PROCESS FOR THE PREPARATION OF PERIODATES

[75] Inventors: Antonius L. B. Dijt, Broekhuizen; Wilhelmus R. M. Martens, Venlo-Blerick; Johan T. Tinge, Sittard; Jan C. Wisse, Breukelen; Rudolf M. Eder, Montfoort, all of Netherlands

[73] Assignee: DSM N.V., Heerlen, Netherlands

[21] Appl. No.: 09/181,669

[22] Filed: Oct. 29, 1998

[30] Foreign Application Priority Data

Oct. 30, 1997 [NL] Netherlands ............... 1007395

[51] Int. Cl.⁷ ................................. C01B 11/22
[52] U.S. Cl. ............ 423/476; 423/184; 423/462; 423/472
[58] Field of Search ............... 423/462, 472, 423/476, 184, 197, 473

[56] References Cited

U.S. PATENT DOCUMENTS

| | | | |
|---|---|---|---|
| 4,134,967 | 1/1979 | Hillis et al. | 423/476 |
| 4,176,167 | 11/1979 | Jernigan et al. | 423/476 |
| 4,584,071 | 4/1986 | Bissot | 210/683 |
| 4,687,565 | 8/1987 | Hirakata et al. | 204/258 |

FOREIGN PATENT DOCUMENTS

| | | | |
|---|---|---|---|
| 0518727 | 12/1992 | European Pat. Off. | |
| 79005A | 1/1971 | Germany. | |
| 4-202002 | 7/1992 | Japan | 423/476 |
| 4-202003 | 7/1992 | Japan | 423/476 |

OTHER PUBLICATIONS

Utsunomiya et al.; Production of Disodium Trihydrogen Paraperiodate; Patent Abstracts of Japan; JP 04–202001; Jul. 22, 1992.

Roques, et al.; Preparation des periodates; J. Pharm. Chim.; vol. 6, No. 16, 1902; pp. 120–121.

*Primary Examiner*—Ngoc-Yen Nguyen
*Attorney, Agent, or Firm*—Pillsbury Madison & Sutro LLP

[57] ABSTRACT

Process for the preparation of a sodium paraperiodate wherein an iodine compound is converted into the sodium paraperiodate in the presence of $Na^+$ ions by means of an alkali metal hydroxide and an alkali metal hypochlorite. The iodine compound is applied in the form of an iodine-containing mixture in which besides the iodine compound in the form of $I_2$, iodide or iodate compounds, one or more compounds chosen from the group of chlorides, bromides, sulphates, sulphites, carbonates, bicarbonates, nitrates and dissolved organic components are also present. The invention also relates to the preparation of sodium metaperiodate and other alkali and alkali earth metal periodates, wherein the sodium paraperiodate obtained is converted into sodium periodate or into an alkali or alkali earth metal periodate by means of an acid or an alkali and alkali earth metal salt at an elevated temperature. The acid used preferably is $HNO_3$.

13 Claims, No Drawings

PROCESS FOR THE PREPARATION OF PERIODATES

BACKGROUND OF THE INVENTION

1. Field of the Invention

The invention relates to a process for the preparation of a sodium paraperiodate ($Na_3H_2IO_6$) in which an iodine compound is converted into the sodium paraperiodate in the presence of $Na^+$ ions by means of an alkali metal hydroxide and an alkali metal hypochlorite.

2. Background Information.

F. Roques et al. in J. Pharm. Chim. [6] (1902) 120, describe the preparation of an alkali metal paraperiodate by boiling a highly alkaline alkali metal iodide solution with a large excess of sodium hypochlorite (NaClO) solution.

A drawback of the Rogues process is that it employs a relatively costly iodine source.

SUMMARY OF THE INVENTION

The applicants have discovered that in the preparation of sodium paraperiodate the iodine compound can suitably be applied in the form of an iodine-containing mixture in which besides the iodine compound in the form of $I_2$, iodide or iodate compounds, one or more compounds chosen from the group of chlorides, bromides, sulphates, sulphites, carbonates, bicarbonates, nitrates and dissolved organic components are also present. Such mixtures are generated as waste streams in the production of various chemical compounds, in particular iodine-containing pharmaceuticals. The process according to the present invention thus allows waste streams to be worked up to a useful product, while the iodine that is present in the waste streams can surprisingly be recovered quantitatively and selectively.

DETAILED DESCRIPTION OF THE INVENTION

The iodine-containing mixtures that can suitably be applied in the process according to the present invention can originate from the preparation of various chemical products, in particular pharmaceuticals. The composition of the mixtures is not particularly critical. The mixture can, for instance, contain organic and inorganic salts and other organic components. Examples of waste streams that can suitably be used in the process are mixtures which, besides the iodine compound, also contain NaCl and organic compounds as well. In particular a suitable mixture which, besides 30–65 wt. % NaI, $I_2$ or $NaIO_3$, also contains 30–55 wt. % NaCl and 2–20 wt. % organic compounds, for instance in water, can be used. Also a mixture which, besides 20–95 wt. % NaI, $I_2$ or $NaIO_3$, also contains 0.5–5 wt. % sodium acetate and 1–15 wt. % other organic components can be used. Other examples are mixtures which besides the iodine compound also contain salts, in particular a mixture which besides 10–60 wt. % NaI, $I_2$ or $NaIO_3$ also contains 30–70 wt. % salts, for instance 5–20 wt. % $Na_2SO_4$, 2–15 wt. % $NaHCO_3$, 2–15 wt. % $Na_2CO_3$, 2–15 wt. % NaCl and/or 1–10 wt. % $Na_2SO_3$, and/or 5–20 wt. % of organic components. The above mentioned weight percentages are calculated with respect to the mixture exclusive of any water. In all these cases, of course, Na may have been replaced in whole or in part by K. It has been found that such waste streams can suitably be employed as an iodine source for the present invention.

The temperature at which the reaction is carried out by preference lies between about 80° and 105° C., in particular between about 90° and 100° C. The pH at which the reaction is carried out by preference lies between 11 and 15, in particular between about 12 and 14. The concentration of the iodine compound in the starting mixture is by preference chosen so that in the aqueous reaction mixture the iodine-containing compounds are just barely in solution. Any solid material present in the starting material can be removed previously, for instance by filtration.

The amount of alkali metal hypochlorite applied relative to the amount of iodine-containing compound depends on the composition of the waste stream, in particular on the iodine compounds it contains; for instance, for the conversion of iodide ion ($I^-$) theoretically 4 equivalents of alkali metal hypochlorite are required, for the conversion of iodine, ($I_2$) 3.5 equivalents of alkali metal hypochlorite (per I) are required and for the conversion of iodate, ($IO_3^-$) 1 equivalent of alkali metal hypochlorite (per I) is required. In practice, the amount of alkali metal hypochlorite to be applied will generally be between about 1 and 10 equivalents, in particular between about 3 and 7 equivalents, relative to the amount of I. The alkali metal hypochlorite to be applied can optionally also be formed in situ, for instance from $Cl_2$ and NaOH and KOH.

The amount of $Na^+$ ions present in the reaction mixture is not very critical. For maximum conversion at least 3 equivalents of $Na^+$ ions (relative to the amount of I) should be present in the reaction process. The amount of $Na^+$ ions to be added to the waste stream is of course dependent on the composition of the waste stream, in particular the amount of $Na^+$ ions present. The presence of more than 10 equivalents, in particular more than 4 equivalents of $Na^+$ ions in the reaction process generally does not offer any additional advantages in practice.

The amount of alkali metal hydroxide which can be applied in the process according to the present invention is not particularly critical. For maximum conversion at least 2 equivalents of $OH^-$ ions (relative to the amount of I) are required in the reaction process. Preferably, an excess of hydroxide is applied.

In the preparation of $Na_3H_2IO_6$ according to the present invention, and its subsequent conversion to any other periodates, the alkali metal hypochlorite used is by preference sodium hypochlorite and the alkali metal hydroxide is by preference sodium hydroxide, with the option of replacing part of the sodium compounds by other alkali metals and alkali earth metals. The formed $Na_3H_2IO_6$ will be precipitated and can be recovered.

The sodium paraperiodate obtained can subsequently be converted into other periodates if desired, for instance alkali or alkali earth metal periodates.

Thus, the sodium paraperiodate obtained can subsequently be converted, for instance, into sodium metaperiodate ($NaIO_4$), for instance by contacting the sodium paraperiodate at an elevated temperature with an acid, for instance, nitric acid or sulphuric acid. The temperature at which the treatment with an acid takes place is preferably between about 80° and 105° C., in particular between about 90° and 100° C. In order to obtain extra white sodium metaperiodate, an additional purification step is preferably carried out. First, the sodium paraperiodate is dissolved in the acid, for instance at a pH of between about 0 and 3, by preference between about 0.5 and 2.5. The resulting solution is treated with an adsorbing agent, for instance activated carbon, silica, dicalite, or $Al_2O_3$, and then the adsorbing agent is filtered out, also at an elevated temperature. Next, the sodium metaperiodate produced can be recovered, for instance by boiling down and, optionally, cooling, while care is taken to keep in solution the sodium salt that is present, for instance $NaNO_3$. The sodium metaperiodate obtained can then be converted by a known process into potassium periodate.

The sodium metaperiodate obtained can also suitably be converted into a periodate of other alkali and alkali earth metals, for instance barium periodate or potassium periodate. To that effect the sodium periodate is contacted with the corresponding alkali or alkali earth salt of an acid, for instance nitric acid or sulphuric acid. The acid and the pH are preferably chosen such that the sodium salt remains in solution and the desired alkali or alkali earth metal salt precipitates. In practice nitric acid is often very suitable for this purpose. Optionally, an additional purification step can also be performed in this case.

The invention will be further elucidated by means of the following examples, without however being restricted thereto.

EXAMPLE I

With stirring, 364 g of a 25 wt. % aqueous NaOH (364 g) were added to 300 g of a waste stream containing about 155 g of NaI (1.03 mol). The waste stream was composed of 52 wt. % NaI, 38 wt. % NaCl and 5 wt. % of organic compounds in water. The mixture was heated to 95° C., then, over 120 minutes, 2450 ml of an approximately 14% aqueous NaOCl solution were metered in, with the temperature being held between 95° and 100° C. Stirring was continued for 60 minutes at a temperature between 95° and 100° C. The reaction mixture was then cooled to 30° C. and the precipitate formed was filtered out and washed with 180 ml of 1N NaOH.

Yield: 296 g, after drying.
Efficiency: 97.3%
Purity: 99.2%

EXAMPLE II

With stirring, 17.6 g of a 25 wt. % aqueous NaOH solution were added to 100 g of a waste stream having a general composition of about 30 wt. % NaI, 1 wt. % $CH_3COONa$, and 2 wt. % other organic compounds in water. The mixture was heated to 95° C. and, over 60 minutes, 550 ml of an approximately 14% aqueous NaOCl solution were metered in, with the temperature being kept between 95° and 100° C. Stirring was continued for 60 minutes at a temperature between 95° and 100° C. The reaction mixture was then cooled to 30° C. and the precipitate formed was filtered out and washed with 180 ml of 1N NaOH.

Yield (without any optimization): 43 g, after drying.
Purity: 99.1%

EXAMPLE III

With stirring, 17.6 g of a 25 wt. % aqueous NaOH solution were added to 200 g of waste stream (general composition: about 15 wt. % NaI, 10 wt. % $Na_2SO_4$, 5 wt. % $NaHCO_3$, 5 wt. % $KHCO_3$, 5 wt. % NaCl, 3 wt. % ammonium salts, 2 wt. % $Na_2SO_3$ and about 10 wt. % other organic compounds in water). The mixture was heated to 95° C. Next, over 70 minutes, 550 ml of an approximately 14% aqueous NaOCl solution were metered in, with the temperature being kept between 95° and 100° C. Then stirring was continued for 60 minutes at a temperature between 95° and 100° C. The reaction mixture was then cooled to 30° C. and the precipitate formed was filtered out and washed with 20 ml of water and 20 ml of 1N NaOH.

Yield after drying: 68 g.
Purity: 99.2%

EXAMPLE IV

To 237 g of $Na_3H_2IO_6$, prepared as described in Example I, were added 288 ml of demineralized water and then 152 g of 65 wt. % nitric acid (to reach pH=1). The solution was diluted with demineralized water to a volume of 550 ml and heated to 80° C. Then approx. 0.5 ml of 25 wt. % aqueous NaOH was added to reach pH=2.5. The mixture was heated to 95° C. and then 0.1 g of activated carbon and 0.1 g of dicalite were added. After stirring for 10 minutes the carbon and the decalite were filtered out on a precoated filter. The carbon and the filter were washed with 45 ml of demineralized water. Nitric acid (0.9 g of 65 wt. %) was added to the filtrate, after which water was distilled off under slowly decreasing pressure until a final volume of 250 ml was reached (final pressure: about 120 mbar (12 kPa); final temperature: 50–55° C.). Then 5 g of 65 wt. % nitric acid were added and after 5 minutes of stirring the solid was filtered out and washed with 2×9 ml of demineralized water. The final product was dried under vacuum at 65° C.

Yield: 145 g.
Efficiency: 85%
Purity: 99.8%.

The mother liquor was worked up. Demineralized water (250 ml) were added to the mother liquor, and the mixture was heated to 85° C.; 25 g of $Na_3H_2IO_6$ were then added and the temperature was raised further to 95° C. Approximately 18 g of 25 wt. % aqueous NaOH was added to reach pH=11. After adding 21 g of an approximately 14% aqueous NaOCl solution and 15 minutes of stirring, 3.5 g of 25 wt. % aqueous NaOH solution were added to reach pH>11. The reaction mixture was then heated to reflux. Heating and stirring were stopped for 30 minutes, so that the $Na_3H_2IO_6$ could settle. The clear water layer was decanted. Then 510 ml of demineralized water were added and the liquid was stirred for 5 minutes. Stirring was stopped and, after 60 minutes, the clear water layer was decanted. The remaining suspension of $Na_3H_2IO_6$ could be used again in a following reaction or filtered.

Yield: about 60 g.
Overall efficiency: 99%.

What we claim is:

1. A process for the preparation of sodium paraperiodate comprising:

contacting a mixture comprising an iodine-containing compound with an alkali metal hydroxide and an alkali metal hypochlorite in the presence of $Na^+$ ions to precipitate out sodium paraperiodate, separating the precipitated sodium paraperiodate, wherein said mixture comprises 10 to 95 weight % of iodine or an iodide- or iodate-containing compound and at least one compound selected from the group consisting of chlorides, bromides, sulphates, sulphites, carbonates, bicarbonates, nitrates and dissolved organic components.

2. A process according to claim 1, wherein said alkali metal hydroxide comprises sodium hydroxide.

3. A process according to claim 1, wherein said alkali metal hypochlorite comprises sodium hypochlorite.

4. A process according to claim 1, wherein at least 3 equivalents of $Na^+$ ions, relative to the amount of I in said mixture, are present.

5. A process for the preparation of sodium metaperiodate comprising:

contacting a mixture comprising an iodine-containing compound with an alkali metal hydroxide and an alkali metal hypochlorite in the presence of Na$^+$ ions to precipitate out sodium paraperiodate, separating the precipitated sodium paraperiodate, wherein said mixture comprises 10 to 95 weight % of iodine or an iodide- or an iodate-containing compound and at least one compound selected from the group consisting of chlorides, bromides, sulphates, sulphites, carbonates, bicarbonates, nitrates and dissolved organic components, and converting said separated sodium paraperiodate into sodium metaperiodate.

6. A process according to claim 5, wherein said conversion of sodium paraperiodate to sodium metaperiodate is by means of an acid at an elevated temperature.

7. A process according to claim 6, wherein the conversion of paraperiodate into sodium metaperiodate comprising the steps of:

dissolving said separated sodium paraperiodate with an acid to form a reaction mixture, treating the resulting reaction mixture with an adsorbing agent at an elevated temperature, isolating and removing the adsorbing agent, and recovering sodium metaperiodate from the remaining reaction mixture.

8. A process according to claim 6, wherein said acid comprises nitric acid.

9. A process according to claim 7, wherein said acid comprises nitric acid.

10. A process for the preparation of an alkali metal paraperiodate other than sodium paraperiodate or an alkaline earth metal paraperiodate comprising:

contacting a mixture comprising an iodine-containing compound with an alkali metal hydroxide and an alkali metal hypochlorite in the presence of Na$^+$ ions to precipitate out sodium paraperiodate, separating the precipitated sodium paraperiodate, wherein said mixture comprises 10 to 95 weight % of iodine or an iodide- or an iodate-containing compound and at least one compound selected from the group consisting of chlorides, bromides, sulphates, sulphites, carbonates, bicarbonates, nitrates and dissolved organic components, and converting said separated sodium paraperiodate into a paraperiodate of a different alkali or alkali earth metal by means of a different alkali or alkali earth metal salt of an acid, respectively.

11. A process according to claim 10, wherein said acid comprises nitric acid.

12. A process for the preparation of an alkali metal metaperiodate other than sodium metaperiodate or an alkaline earth metal metaperiodate comprising:

contacting a mixture comprising an iodine-containing compound with an alkali metal hydroxide and an alkali metal hypochlorite in the presence of Na$^+$ ions to precipitate out sodium paraperiodate, separating the precipitated sodium paraperiodate, wherein said mixture comprises 10 to 95 weight % of iodine or an iodide- or an iodate-containing compound and at least one compound selected from the group consisting of chlorides, bromides sulphates, sulphites, carbonates, bicarbonates, nitrates and dissolved organic components, and converting said separated sodium paraperiodate into a metaperiodate of a different alkali or alkaline earth metal by means of a different alkali or alkaline earth metal salt of an acid, respectively.

13. A process according to claim 12, wherein said acid comprises nitric acid.

* * * * *